R. W. GORDON.
PULP AGITATOR.
APPLICATION FILED JAN. 3, 1910.
954,511.
Patented Apr. 12, 1910.
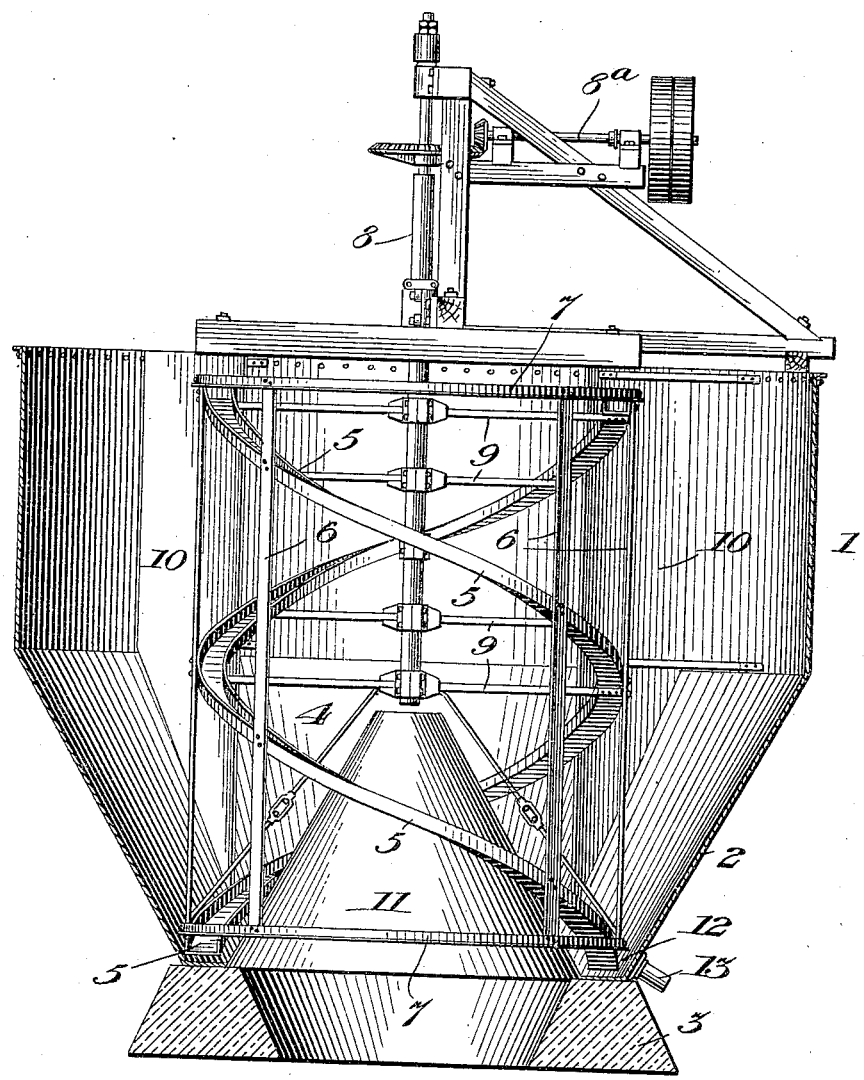

UNITED STATES PATENT OFFICE.

ROBERT WILLIAM GORDON, OF DENVER, COLORADO, ASSIGNOR TO THE STEARNS-ROGER MANUFACTURING CO., OF DENVER, COLORADO, A CORPORATION OF COLORADO.

PULP-AGITATOR.

954,511.   Specification of Letters Patent.   Patented Apr. 12, 1910.

Application filed January 3, 1910. Serial No. 536,177.

*To all whom it may concern:*

Be it known that I, ROBERT W. GORDON, a subject of the King of Great Britain, and resident of Denver, county of Denver, State of Colorado, have invented certain new and useful Improvements in Pulp-Agitators; and I do hereby declare the following to be a full, clear, and exact description of the invention, such as will enable others skilled in the art to which it appertains to make and use the same.

This invention relates to agitators, and has special reference to agitators for ore pulp, *i. e.* pulp composed of pulverized ore and the solution which extracts the metallic values therefrom, as in the cyanid process.

The ore is usually in the form of tube-milled sand and slimes, and the primary object of the invention is to provide an apparatus in which the pulp containing such sand and slimes is subjected by simple mechanism to a thorough and effective agitation and aeration, to the end that all of the solids will be kept in suspension in the solution and the extraction of the values by the latter thereby facilitated and expedited. However, it is to be understood that the device is well adapted for use in other connections where solids of different kinds are to be kept in suspension in solutions.

More specifically, the invention aims to provide an agitator comprising a tank and a rotary or other conveyer acting to raise the solids toward the surface of the solution near the central part of the tank, there being suitable baffles in the outer part of the tank which prevent the rotation of the entire solution under the action of the conveyer or stirrer and permit the settling of the solids near the periphery of the tank or vessel. The conveyer is preferably carried by an open frame through which the solids may settle at the center of the tank also. In this way, an upward and downward circulation is obtained, the particles being raised to the surface of the solution and then permitted to sink to the bottom, after which they are raised again, whereby an especially efficient agitation and aeration is produced. A cone is placed in the bottom of the tank and the lower tank wall and the wall of said cone converge downward to a point adjacent the lower end of the conveyer or stirrer, so that the settling sand and slimes slide down along the inclined walls of the tank and cone and into the path of the conveyer, by which they are raised again, thus insuring the elevation of all of the solids and obviating any tendency of the latter to pile up on the bottom of the tank.

The accompanying drawing illustrates in vertical section an agitator embodying the invention.

The tank or receptacle can be made of any convenient form and the agitating device, cone and baffles may, in practice, be used in connection with various sorts of tanks already installed. In constructing the device as a whole, however, the lower wall of the tank 1 is preferably formed with a downward and inward inclination, as shown at 2, viz. the tank tapers toward the bottom. In case an ordinary tank is to be used an inclined wall corresponding to the surface 2 is built into the same in any appropriate way. In the construction shown, the tank is formed of sheet metal and rests on a suitable base 3.

Located centrally within the tank on the shaft 8, is an upright rotary helical conveyer or agitator 4 that serves to agitate or stir the solution near the central part of the tank and also to raise the sand and slimes from the bottom to the surface of the solution. Said conveyer preferably comprises two or more helical flights in the form of troughs or channels 5 mounted in a suitable frame that includes, in the embodiment shown, upright connecting strips 6 applied to the trough and to upper and lower end-rings 7, said frame being connected to the upright shaft 8 by means of radiating rods 9 secured at their outer ends to the troughs. The shaft 8 is driven by power from the cross-shaft $8^a$ which is geared thereto. In the outer part of the tank are arranged upright radial baffle plates 10, the outer edges of which abut against the inner surface of the tank wall, while their inner edges extend into close proximity to the conveyer, as shown. These plates extend substantially throughout the height of the tank, and serve to prevent the rotation of the solution in the outer or peripheral portion of the latter.

Within the open conveyer frame and resting on the bottom of the tank is a cone 11, and it will be noted that the wall of said cone and the lower tank wall 2 converge downward, and that at the bottom of the tank there is just sufficient space between them to accommodate, with suitable clearance, the lower ends of the conveyer troughs, which ends rotate in a horizontal plane in the annular channel 12 thus formed in the tank bottom.

In the operation of the apparatus, the ore pulp is fed in any suitable way over the rim of the tank, and the rotation of the conveyer will cause the solid particles to be raised from the bottom of the tank to the surface, so that the pulp is thoroughly agitated and aerated. When the solids are discharged from the upper end of the conveyer they are then at liberty to settle again, and they do this at the central part of the tank, within the conveyer frame, and also in the outer or peripheral part of the tank, whereby, in all, three vertically directed currents are set up, i. e. an upward current in the path of the conveyer and downward currents around and within the same respectively. In the outer part of the tank the rotation of the body of solution is prevented by the baffles 10, and hence agitation at that point is prevented to such an extent that the settling of the solids in a substantially straight line, is permitted. The solids settle either on the cone 5 or on the inclined tank wall 2 and of course this will cause them all to slide down into the annular channel 12 and into the lower ends of the revolving conveyer flights, whereupon such solids will be raised to the surface as before. The pulp may be drawn off continuously or intermittently by means of an outlet pipe 13 connected with the bottom of the tank adjacent the annular channel 12.

The primary advantages of the construction are that the solids are raised and then permitted to settle gradually in the same tank while agitation is still going on, the agitation and raising action of the conveyer being restricted as to lateral area, as described; also, very simple means are provided for insuring the agitation and aeration of all of the solids contained in the solution, and in fact the device as a whole combines simplicity of construction and operation with marked efficiency in actual practice. The tank does not need to be of great depth, and agitation is always complete irrespective of the level of the solution. Again, the power required is relatively small and there are no wearing parts that need constant replacement. If the agitation obtained by repeatedly bringing each particle of solid matter to the surface is not considered sufficient in any given case, air under pressure may be injected into the path of the troughs by suitable connections, as will be obvious.

The device is particularly adapted for use ahead of filters of either the pressure or vacuum type, as it will furnish an absolutely homogeneous feed, either continuously or intermittently; and of course any number of agitators may be used in series for continuous agitation, in which case there is not the least inconvenience from the equalization of the pulp level.

What I claim is:—

1. In a pulp agitator, a tank, a rotary open conveyer therein through which the solids settle, and means to prevent the circulation of the entire body of solution under the action of the conveyer.

2. In a pulp agitator, a tank, a rotary open conveyer therein to raise the solids from the bottom of the tank to the surface of the solution, means located around the conveyer to prevent the rotation of the body of solution, and means to deflect into the path of the conveyer the solids that settle therethrough.

3. In a pulp agitator, a tank, an upright rotary conveyer therein having a framework open at the center, and means located around the conveyer to prevent the rotation of the body of solution in the peripheral part of the tank, the solids being permitted to settle in such part and also through the open frame of the conveyer.

4. In a pulp agitator, a tank, a rotary upright helical conveyer located centrally therein, and fixed radial baffles having free inner edges disposed in a series around the conveyer.

5. In a pulp agitator, a tank, a rotary upright conveyer therein, and fixed upright baffle plates arranged radially in the tank around the conveyer, the outer edges of said plates abutting against the inner surface of the tank wall, and the inner edges thereof extending into close proximity to the conveyer.

6. In a pulp agitator, a tank tapering toward the bottom, an upright rotary conveyer in the tank and comprising helical flights, a cone on the bottom of the tank, the wall of said cone and that of the tank converging downward to afford an annular channel in which move the ends of the conveyer flights, and baffle plates in the outer part of the tank, around the conveyer.

In testimony whereof I affix my signature, in presence of two witnesses.

ROBERT WILLIAM GORDON.

Witnesses:
 DAVID BLACK,
 BURT STEARNS.